United States Patent
Shinozaki et al.

(10) Patent No.: US 9,903,301 B2
(45) Date of Patent: Feb. 27, 2018

(54) CONTROL APPARATUS WITH RANGE CONTROL TO SUPPRESS INTERFERENCE FOR INTERNAL COMBUSTION ENGINE, AND METHOD THEREOF

(71) Applicant: HITACHI AUTOMOTIVE SYSTEMS, LTD., Hitachinaka-shi, Ibaraki (JP)

(72) Inventors: Yuya Shinozaki, Isesaki (JP); Naoki Okamoto, Isesaki (JP); Akira Kiyomura, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/030,663

(22) PCT Filed: Sep. 12, 2014

(86) PCT No.: PCT/JP2014/074220
§ 371 (c)(1),
(2) Date: Apr. 20, 2016

(87) PCT Pub. No.: WO2015/060036
PCT Pub. Date: Apr. 30, 2015

(65) Prior Publication Data
US 2016/0252022 A1 Sep. 1, 2016

(30) Foreign Application Priority Data

Oct. 23, 2013 (JP) .................................. 2013-219829

(51) Int. Cl.
*F02D 41/26* (2006.01)
*F02D 15/02* (2006.01)
(Continued)

(52) U.S. Cl.
CPC ....... *F02D 41/266* (2013.01); *F02D 13/0234* (2013.01); *F02D 15/02* (2013.01);
(Continued)

(58) Field of Classification Search
CPC ......... F02D 15/00–15/04; F02D 13/00–13/08; F02D 43/00; F02D 43/04; F02D 2041/001; F02D 41/266; F02D 41/22
(Continued)

(56) References Cited

U.S. PATENT DOCUMENTS

| 5,877,958 | A | * | 3/1999 | Horiuchi | ............... | F02D 41/266 |
| | | | | | | 701/102 |
| 6,938,593 | B2 | * | 9/2005 | Magner | ................... | F01L 1/022 |
| | | | | | | 123/90.15 |

(Continued)

FOREIGN PATENT DOCUMENTS

| JP | 2002-276446 A | 9/2002 |
| JP | 2004-218551 A | 8/2004 |

(Continued)

*Primary Examiner* — Hai Huynh
*Assistant Examiner* — Robert Werner
(74) *Attorney, Agent, or Firm* — Foley & Lardner LLP (57) ABSTRACT

A control apparatus is provided for an internal combustion engine equipped with compression ratio variable and variable valve mechanisms and includes first and second sub control apparatuses and a main control apparatus. The first sub control apparatus has a first microcomputer controlling the compression ratio variable mechanism, the second sub control apparatus has a second microcomputer controlling the variable valve mechanism, and the main control apparatus has a third microcomputer that calculates a target value of a top dead center of a piston and a target value of a valve timing of an intake valve, and outputs the target values. The main control apparatus changes a variable range of the target valve of the top dead center of the piston according to the (Continued)

valve timing of the intake valve, and the first sub control apparatus changes a control range of the top dead center of the piston.

6 Claims, 5 Drawing Sheets

(51) Int. Cl.
  *F02D 13/02* (2006.01)
  *F02D 41/00* (2006.01)
(52) U.S. Cl.
  CPC ......... *F02D 41/0002* (2013.01); *F02D 41/26* (2013.01); *F02D 2041/001* (2013.01); *Y02T 10/18* (2013.01); *Y02T 10/42* (2013.01)
(58) Field of Classification Search
  USPC ...... 123/48 R, 48 B, 78 R, 78 A, 78 E, 78 F, 123/90.11, 90.15, 347, 348; 701/103, 105
  See application file for complete search history.

(56) References Cited

U.S. PATENT DOCUMENTS

| | | | | |
|---|---|---|---|---|
| 6,994,061 | B2* | 2/2006 | Magner | F01L 1/022 123/399 |
| 7,278,383 | B2 | 10/2007 | Kamiyama et al. | |
| 7,506,620 | B2* | 3/2009 | Yasui | F02D 13/0226 123/48 R |
| 7,997,241 | B2* | 8/2011 | Kamiyama | F01L 13/0015 123/90.15 |
| 8,109,243 | B2* | 2/2012 | Akihisa | F01L 13/0063 123/48 C |
| 9,037,382 | B2* | 5/2015 | Hiyoshi | F01L 1/34 701/103 |
| 2015/0034052 | A1* | 2/2015 | Shimizu | F02D 15/02 123/48 R |
| 2015/0122226 | A1* | 5/2015 | Kamada | F02D 13/02 123/48 R |

FOREIGN PATENT DOCUMENTS

JP 2007-120464 A 5/2007
WO WO-2013/172130 A1 11/2013

\* cited by examiner

CONTROL APPARATUS WITH RANGE CONTROL TO SUPPRESS INTERFERENCE FOR INTERNAL COMBUSTION ENGINE, AND METHOD THEREOF

TECHNICAL FIELD

The present invention relates to a control apparatus for an internal combustion engine and a control method therefor and more particularly to a technique of suppressing the interference between two controlled objects.

BACKGROUND ART

Patent Document 1 discloses a control apparatus for an internal combustion engine comprising a variable valve mechanism that changes the valve close timing of the intake valve, and a compression ratio variable mechanism that changes the compression ratio by changing the top dead center of the piston. In such a control apparatus, while the compression ratio variable mechanism keeps the compression ratio as high as that for idling operations at the startup of the internal combustion engine, the variable valve mechanism allows the intake valve to close at a timing which is far from the bottom dead center at the beginning of cranking. The variable valve mechanism also allows the intake valve to close when the piston comes close to the bottom dead center after cranking has started.

REFERENCE DOCUMENT LIST

Patent Document

Patent Document 1: JP 2002-276446 A

SUMMARY OF THE INVENTION

Problems to be Solved by the Invention

If an internal combustion engine is provided with, for example, a compression ratio variable mechanism that changes the top dead center of a piston to thereby change a compression ratio and a variable valve mechanism that changes the valve timing for an engine valve, a control apparatus for controlling these mechanisms might execute processing to limit an indicated (target) controlled variable for one mechanism according to the controlled variable for the other mechanism in order to suppress the interference between the piston and the engine valve. Here, if the control apparatus is composed of a main control apparatus that outputs an indicated value and a sub control apparatus that executes control according to the indicated value, and the main control apparatus outputs an indicated value to the sub control apparatus by way of a memory device such as a RAM or buffer, the following problem may occur. That is, when the memory device suffers from any failure, the sub control apparatus may execute control based on a wrong indicated value in the memory device prior to the detection of the failure in the memory device, resulting in the interference between the piston and the engine valve.

The present invention has been made in view of the above problems and an object of the present invention is to provide a control apparatus for an internal combustion engine and a control method therefor, which can suppress the interference that occurs between two controlled objects due to, for example, a failure in a memory device for transmitting a signal between control apparatuses.

Means for Solving the Problem

In order to achieve the above object, the present invention provides a control apparatus for an internal combustion engine, including: a main control apparatus that indicates a controlled variable for a first controlled object and a controlled variable for a second controlled object; a first sub control apparatus that controls the first controlled object based on an indication from the main control apparatus; and a second sub control apparatus that controls the second controlled object based on an indication from the main control apparatus, in which the main control apparatus changes an indicated range of the controlled variable of the first controlled object based on the controlled variable of the second controlled object, and the first sub control apparatus changes a control range of the controlled variable of the first controlled object based on the controlled variable of the second controlled object.

Further, the present invention provides a control method for an internal combustion engine that controls the internal combustion engine with a main control apparatus that indicates the controlled variable of a first controlled object and the controlled variable of a second controlled object, a first sub control apparatus that controls the first controlled object based on an indication from the main control apparatus, and a second sub control apparatus that controls the second controlled object based on an indication from the main control apparatus, the method comprising the steps of: obtaining information about the controlled variable of the second controlled object with each of the main control apparatus and the first sub control apparatus; changing an indicated value of the controlled variable of the first controlled object with the main control apparatus based on the controlled variable of the second controlled object; and changing the controlled variable of the first controlled object indicated by the main control apparatus with the first sub control apparatus based on the controlled variable of the second controlled object.

Effects of the Invention

According to the present invention, even if a failure occurs in a memory device that temporarily memorizes an indicated controlled variable and the control is executed based on the wrong indication, it is possible to suppress the interference that would occur between the first controlled object and the second controlled object.

MODE FOR CARRYING OUT THE INVENTION

An embodiment of the present invention will be described hereinafter.

Figure 1:
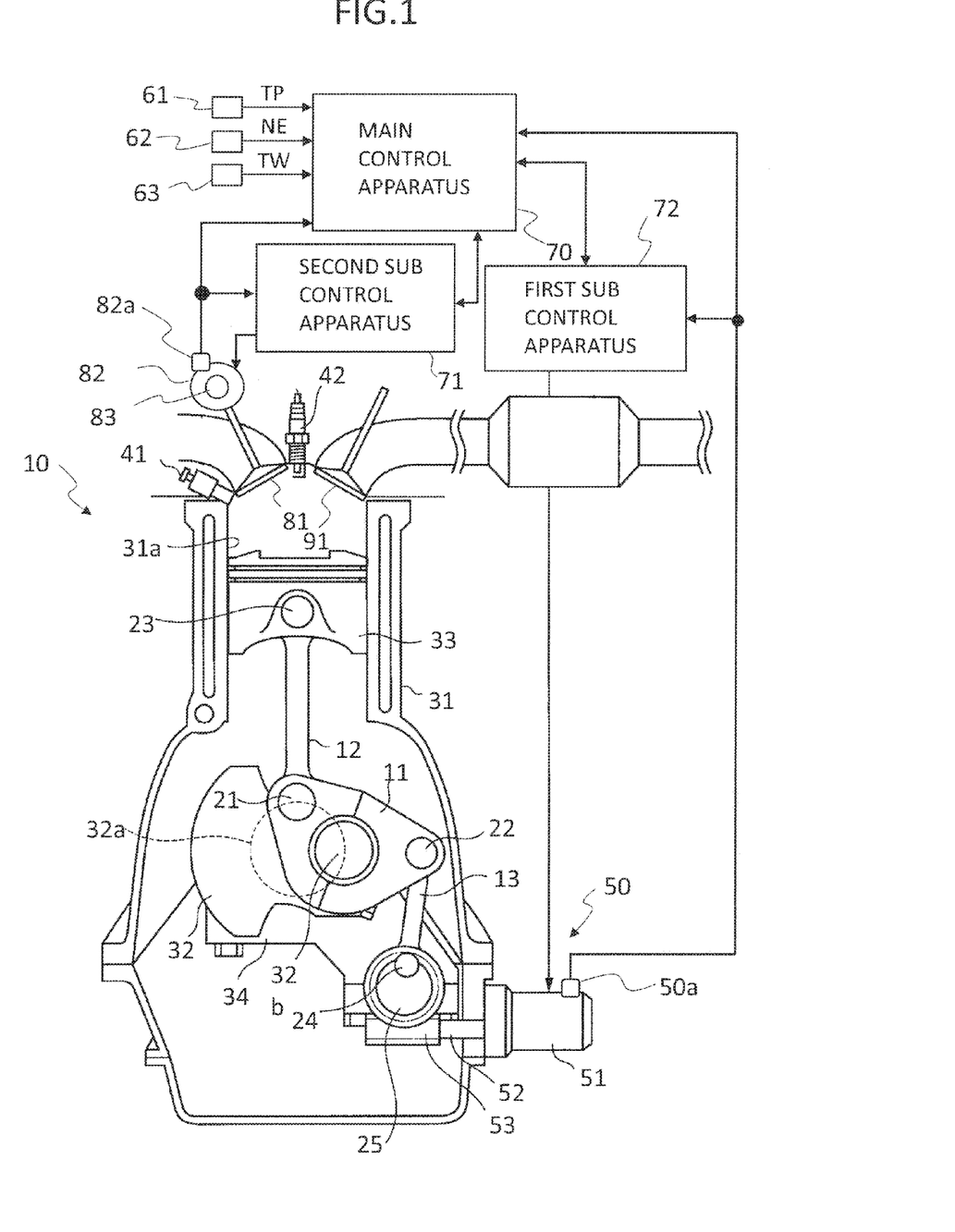
FIG. 1 illustrates an internal combustion engine according to an embodiment of the present invention.

FIG. 1 illustrates an example of an internal combustion engine to which a control apparatus according to the present invention is applied. An internal combustion engine 10 of FIG. 1 includes a compression ratio variable mechanism 50 that changes the top dead center of a piston 33 to change the compression ratio, and a variable valve timing mechanism 82 serving as a variable valve mechanism for changing the valve timing of intake valves 81.

Compression ratio variable mechanism 50 connects a crank shaft 32 to piston 33 by means of a lower link 11 and an upper link 12 and also, restricts movement of lower link 11 with a control link 13 and thus changes the top dead center of piston 33 to thereby change the compression ratio of internal combustion engine 10. Lower link 11 is dividable into two left and right members. The link has a connection hole at substantially the center thereof, which is fitted to a crank pin 32b of crank shaft 32. Lower link 11 is rotated on crank pin 32b.

Crank shaft 32 includes plural journals 32a and crank pin 32b. Journals 32a are rotatably supported by a cylinder block 31 and a ladder frame 34. Crank pins 32b are offset from journal 32a by a predetermined amount, and lower link 11 is rotatably connected thereto. Lower link 11 has one end connected to upper link 12 via a connection pin 21 and the other end connected to control link 13 via a connection pin 22.

Upper link 12 has a lower end connected to one end of lower link 11 via connection pin 21 and an upper end connected to piston 33 via a piston pin 23. Piston 33 moves to and fro inside a cylinder 31a of cylinder block 31 in response to combustion pressure.

Control link 13 is rotatably connected to lower link 11 via connection pin 22 provided at tip end thereof. The other end of control link 13 is connected eccentrically to a control shaft 25 via a connection pin 24. Control link 13 swings on connection pin 24. Control shaft 25 has a gear engaged with a pinion 53 provided on a rotation shaft 52 of an actuator 51. Control shaft 25 is rotated by actuator 51 to move connection pin 24.

Thus-configured compression ratio variable mechanism 50 controls actuator 51 to rotate control shaft 25, by which the top dead center of piston 33 is changed and the compression ratio of internal combustion engine 10 is changed. Note that compression ratio variable mechanism 50 is a well-known mechanism configured to change the top dead center of piston 33 so as to change the compression ratio of internal combustion engine 10. The specific configuration thereof is not limited to that of FIG. 1.

To give an example of variable valve timing mechanism 82, the mechanism changes the relative-rotation phase angle of an intake cam shaft 83 relative to crank shaft 32 by means of an actuator to thereby successively advance/retard a valve open timing of intake valves 81.

Internal combustion engine 10 includes a fuel injection device 41 that directly injects a fuel into a cylinder. Note that the fuel injection device could inject into an intake port provided on the upstream side of intake valves 81. Further, internal combustion engine 10 can be equipped with both of the device for directly injecting fuel into the cylinder and the device for injecting fuel into the intake port.

A control apparatus for controlling above internal combustion engine 10 includes a first sub control apparatus 71 that controls the actuator of compression ratio variable mechanism 50 as the first controlled object, a second sub control apparatus 72 that controls the actuator of variable valve timing mechanism 82 as the second controlled object, and a main control apparatus 70 that calculates a target controlled variable for compression ratio variable mechanism 50 and then outputs the calculated value to first sub control apparatus 71 and also calculates a target controlled variable for variable valve timing mechanism 82 and outputs the calculated value to second sub control apparatus 72. Main control apparatus 70, first sub control apparatus 71, and second sub control apparatus 72 may include a microcomputer incorporating a CPU, a ROM, a RAM, and an input/output interface, for example.

Compression ratio variable mechanism 50 includes a position sensor 50a that detects the angle of control shaft 25 corresponding to the controlled variable of compression ratio variable mechanism 50. An angular signal $VCR_{acs}$ output from position sensor 50a is input to main control apparatus 70 and first sub control apparatus 71. Then, first sub control apparatus 71 executes feedback control by calculating and outputting the manipulated variable of actuator 51 based on a target angle $VCR_{tg}$ of control shaft 25 indicated by main control apparatus 70 and actual angle $VCR_{acs}$ of control shaft 25 detected with position sensor 50a. Note that the target angle $VCR_{tg}$ indicates a target compression ratio, and the angle $VCR_{acs}$ indicates the measurement value of the compression ratio.

Variable valve timing mechanism 82 includes a phase angle sensor 82a that detects the relative-rotation phase angle between crank shaft 32 and intake cam shaft 83 corresponding to the controlled variable of variable valve timing mechanism 82. A phase angle signal $VTC_{acs}$ output from phase angle sensor 82a is input to main control apparatus 70 and second sub control apparatus 72. Then, second sub control apparatus 72 executes feedback control by calculating and outputting a manipulated variable of the actuator of variable valve timing mechanism 82 based on a target phase angle $VTC_{tg}$ indicated by main control apparatus 70 and actual phase angle $VTC_{acs}$ detected with phase angle sensor 82a. Note that the target phase angle $VTC_{tg}$ indicates a target value of the angle of advance for the valve timing of intake valves 81, and the phase angle $VTC_{acs}$ indicates the measurement value for the angle of advance of the valve timing of intake valves 81.

Phase angle sensor 82a may include, for example, a crank angle sensor for detecting the rotation position of crank shaft 32 and a cam angle sensor for detecting the rotation position of intake cam shaft 83. In this case, main control apparatus 70 and second sub control apparatus 72 could be configured to detect an actual phase angle $VTC_{acs}$ based on a phase difference between an output signal of the crank angle sensor and that of the cam angle sensor.

Figure 2:
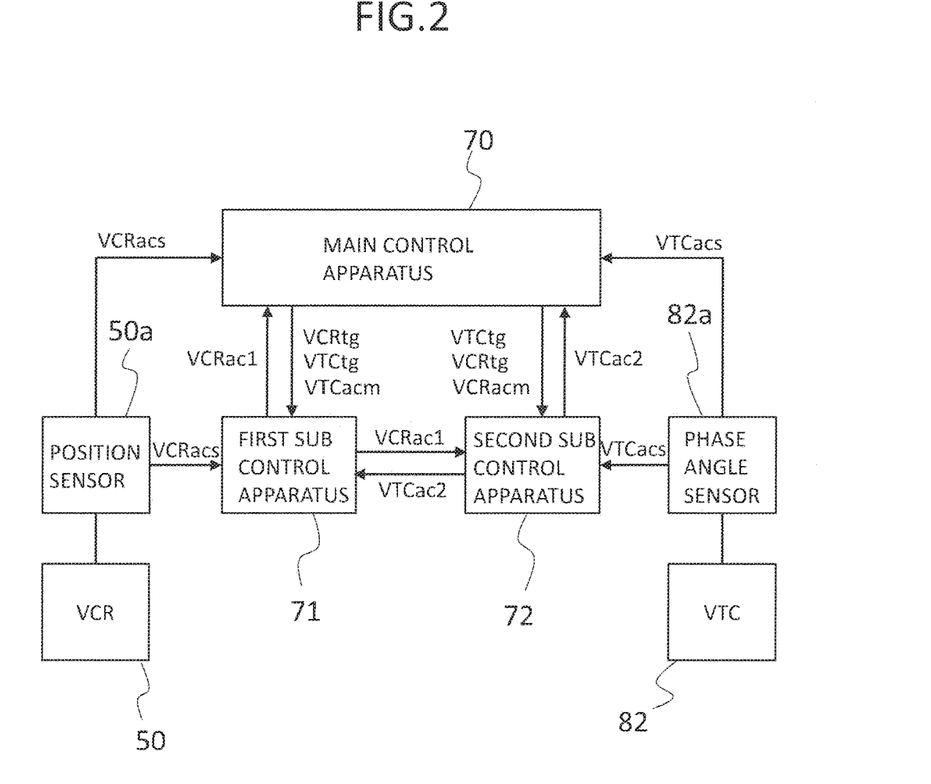
FIG. 2 is a block diagram illustrating the configuration of a control system for an internal combustion engine according to an embodiment of the present invention.

As illustrated in the block diagram of FIG. 2, main control apparatus 70 and first sub control apparatus 71 can communicate with each other. Main control apparatus 70 outputs to first sub control apparatus 71, signals corresponding to a target angle $VCR_{tg}$ of control shaft 25 of compression ratio variable mechanism 50, a target phase angle $VTC_{tg}$ of variable valve timing mechanism 82, and a phase angle $VTC_{acm}$ of variable valve timing mechanism 82 detected with main control apparatus 70 based on the output of phase angle sensor 82a.

First sub control apparatus 71 outputs to main control apparatus 70, signals corresponding to an actual angle $VCR_{ac1}$ of control shaft 25 of compression ratio variable mechanism 50 detected with first sub control apparatus 71 based on the output of position sensor 50a.

Similarly, main control apparatus 70 and second sub control apparatus 72 can communicate with each other.

Main control apparatus 70 outputs to second sub control apparatus 72, signals corresponding to a target phase angle $VTC_{tg}$ of variable valve timing mechanism 82, a target angle $VCR_{tg}$ of control shaft 25 of compression ratio variable mechanism 50, and an actual angle $VCR_{acm}$ of control shaft 25 of compression ratio variable mechanism 50 detected with main control apparatus 70 based on the output of position sensor 50*a*.

Second sub control apparatus 72 outputs to main control apparatus 70, a signal corresponding to a phase angle $VTC_{ac2}$ of variable valve timing mechanism 82 detected with second sub control apparatus 71 based on the output of phase angle sensor 82*a*.

First sub control apparatus 71 and second sub control apparatus 72 can communicate with each other.

First sub control apparatus 71 outputs to second sub control apparatus 72, a signal corresponding to an actual angle $VCR_{ac1}$ of control shaft 25 of compression ratio variable mechanism 50 detected with first sub control apparatus 71 based on the output of position sensor 50*a*.

Second sub control apparatus 72 outputs to first sub control apparatus 71, a signal corresponding to a phase angle $VTC_{ac2}$ of variable valve timing mechanism 82 detected with second sub control apparatus 72 based on the output of phase angle sensor 82*a*.

In addition, main control apparatus 70 receives signals from various sensors for detecting the operation state of internal combustion engine 10. To give examples of the variable sensors, internal combustion engine 10 includes a load sensor 61 for detecting an engine load TP, a rotation sensor 62 for detecting an engine speed NE, and a water temperature sensor 63 for detecting a temperature TW of cooling water for internal combustion engine 10. The cooling water temperature is a state quantity representing an engine temperature. Load sensor 61 detects the state quantity representing the engine load, for example, the intake pressure, the air intake amount, throttle valve opening, or the like.

Main control apparatus 70 detects the operation state of internal combustion engine 10 based on outputs from various sensors, and calculates a target angle $VCR_{tg}$ of control shaft 25 of compression ratio variable mechanism 50 and a target phase angle $VTC_{tg}$ of variable valve timing mechanism 82 based on the detected operation state. Note that the state quantity of internal combustion engine 10 used for calculating the target angle $VCR_{tg}$ and the target phase angle $VTC_{tg}$ is not limited to the engine load, the engine speed, and the cooling water temperature.

Figure 3:
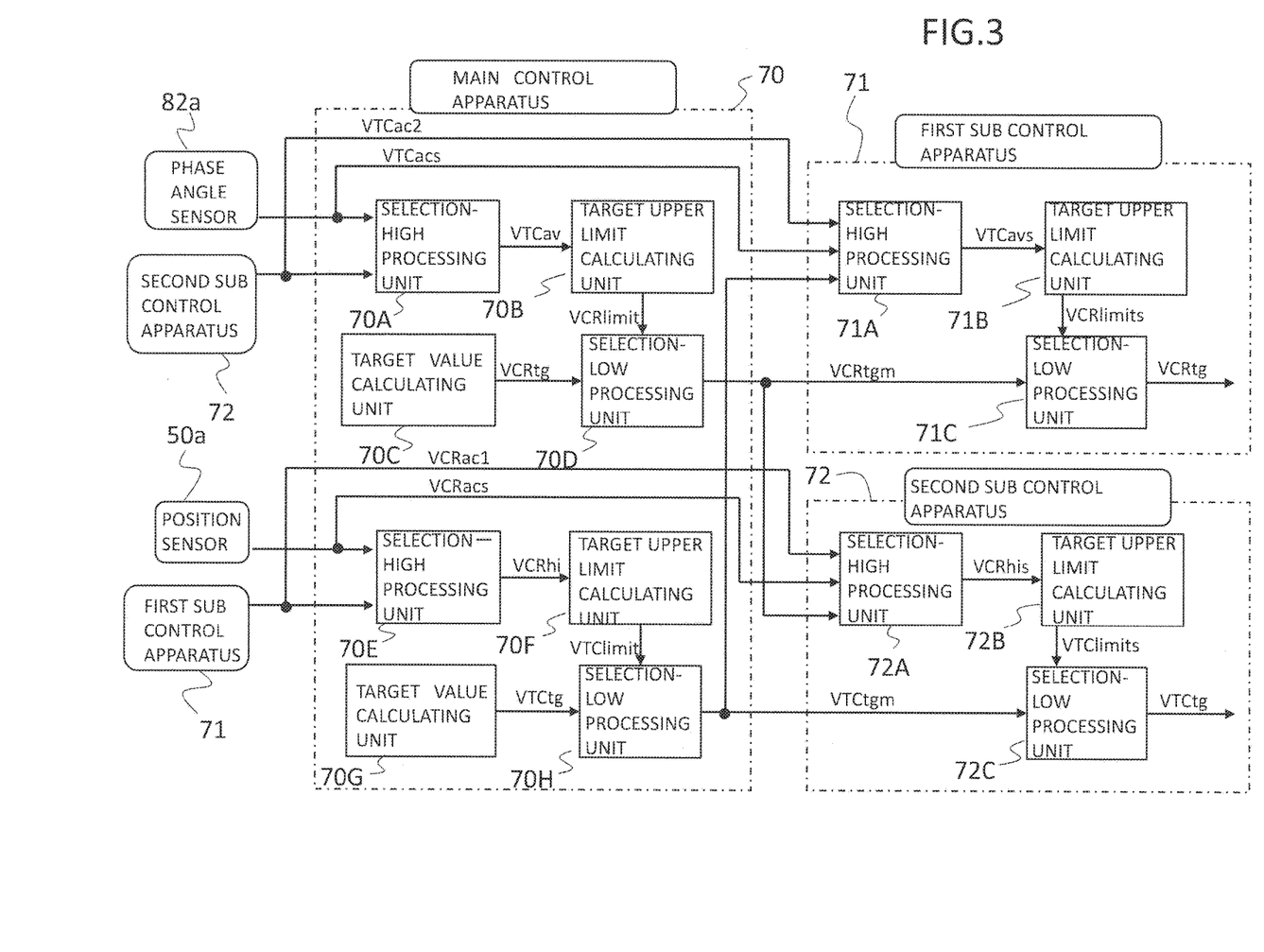
FIG. 3 is a functional block diagram illustrating processing of each control apparatus according to an embodiment of the present invention.

Referring next to the functional block diagram of FIG. 3, a description is given of limit processing on the target angle $VCR_{tg}$, which is executed by main control apparatus 70, i.e., processing for changing an indicated compression ratio range, and limit processing on the target angle $VCR_{tg}$, which is executed by first sub control apparatus 71, i.e., processing for changing an indicated compression ratio range. In FIG. 3, main control apparatus 70 includes a selection-high processing unit 70A, a target upper limit calculating unit 70B, a target value calculating unit 70C, and a selection-low processing unit 70D.

Selection-high processing unit 70A receives a signal corresponding to an actual phase angle $VTC_{acs}$ of variable valve timing mechanism 82, which is output from phase angle sensor 82*a* and a signal corresponding to the actual phase angle $VTC_{ac2}$ of variable valve timing mechanism 82, which is obtained from second sub control apparatus 72.

Selection-high processing unit 70A selects one of the input signals, which advances the valve timing of intake valves 81 compared to the other, and then outputs the selected one as a limit-processing phase angle $VTC_{av}$.

If the valve timing of intake valves 81 is advanced by variable valve timing mechanism 82, a valve lifting amount of intake valves 81 increases at the intake top dead center TDC of piston 33 and hence, the distance between the crown surface of piston 33 and the head of intake valves 81 is reduced. Selection-high processing unit 70A selects one of an actual phase angle $VTC_{acs}$ and an actual phase angle $VTC_{ac2}$, which shortens the distance between piston 33 and intake valves 81 at the intake top dead center TDC and increases the possibility that the interference occurs compared to the other. Selection-high processing unit 70A outputs a signal corresponding to the selected angle.

Selection-high processing unit 70A outputs a signal corresponding to a limit-processing phase angle $VTC_{av}$ to target upper limit calculating unit 70B. Target upper limit calculating unit 70B calculates an upper limit value $VCR_{limit}$ of the top dead center of the piston, at which piston 33 causes no interference with intake valves 81 at the input phase angle $VTC_{av}$, in other words, a limit angle value of control shaft 25 in the direction of raising the piston position at the top dead center.

More specifically, target upper limit calculating unit 70B sets the upper limit value $VCR_{limit}$ at which piston 33 causes no interference with intake valves 81 at the current phase angle $VTC_{av}$.

On the other hand, target value calculating unit 70C calculates a target angle $VCR_{tg}$ of control shaft 25 of compression ratio variable mechanism 50, that is, a target compression ratio based on the operation state of internal combustion engine 10 as described above.

Selection-low processing unit 70D receives the upper limit value $VCR_{limit}$ calculated with target upper limit calculating unit 70B and the target angle $VCR_{tg}$ calculated with target value calculating unit 70C and selects one of these, which corresponds to the lower piston position at the top dead center, that is, a lower compression ratio compared to the other. Selection-low processing unit 70D outputs the selected value as a target angle $VCR_{tgm}$ to first sub control apparatus 71.

Selection-low processing unit 70D limits the target angle $VCR_{tgm}$ so that the piston position at the top dead center does not exceed the upper limit value $VCR_{limit}$.

In response thereto, main control apparatus 70 changes an indicated compression ratio range directed to the first sub control apparatus 71 according to the upper limit value $VCR_{limit}$ corresponding to the actual phase angle of variable valve timing mechanism 82.

In other words, main control apparatus 70 limits an indicated value of the compression ratio, which is output to first sub control apparatus 71, not to cause the interference between piston 33 and intake valves 81 at the current valve timing of intake valves 81.

First sub control apparatus 71 includes selection-high processing unit 71A, target upper limit calculating unit 71B, and selection-low processing unit 71C.

Selection-high processing unit 71A receives a signal corresponding to an actual phase angle $VTC_{acs}$ of variable valve timing mechanism 82, which is output from phase angle sensor 82*a*, a signal corresponding to an actual phase angle $VTC_{ac2}$ of variable valve timing mechanism 82, which obtained from second sub control apparatus 72, and a signal corresponding to a target phase angle $VTC_{tgm}$ subjected to limit processing of main control apparatus 70 as described below.

Among the actual phase angle $VTC_{acs}$, the actual phase angle $VTC_{ac2}$, and the target phase angle $VTC_{tgm}$, selection-high processing unit 71A selects one, which advances the valve timing of intake valves 81 compared to the others and outputs the selected one as a limit-processing phase angle $VTC_{acs}$.

In other words, among the actual phase angle $VTC_{acs}$, the actual phase angle $VTC_{ac2}$, and the target phase angle $VTC_{tgm}$, selection-high processing unit 71A selects the phase angle, which shortens the distance between piston 33 and intake valves 81 at the intake top dead center and increases the possibility that the interference occurs compared to the others.

A phase angle $VTC_{acs}$ output from selection-high processing unit 71A is input to target upper limit calculating unit 71B.

Target upper limit calculating unit 71B calculates an upper value $VCR_{limit2}$ of the piston position at the top dead center that causes no interference between piston 33 and intake valves 81 at the phase angle $VCT_{avs}$, that is, the limit value of an angle of control shaft 25 in the direction of raising the piston position at the top dead center.

Selection-low processing unit 71C receives a target angle $VCR_{tgm}$ output from selection-low processing unit 70D of main control apparatus 70 and an upper limit value $VCR_{limit2}$ output from target upper limit calculating unit 71B.

Selection-low processing unit 71C selects one of the target angle $VCR_{tgm}$ and the upper limit value $VCR_{limit2}$, at which the piston position at the top dead center is lowered compared to the other, and outputs the selected signal as a final target angle $VCR_{tg}$ used for controlling compression ratio variable mechanism 50.

In other words, first sub control apparatus 71 changes a compression ratio range in compression ratio variable mechanism 50 according to an upper limit value $VCR_{limit2}$ corresponding to the controlled variable of variable valve timing mechanism 82.

First sub control apparatus 71 calculates a manipulated variable for actuator 51 based on a target angle $VCR_{tg}$ output from selection-low processing unit 71C and an actual angle $VCR_{acs}$ of control shaft 25 detected with position sensor 50a, and outputs the calculated amount to actuator 51. Thus, the compression ratio changeable with compression ratio variable mechanism 50 is controlled to approximate a target value.

As described above, the target value of compression ratio variable mechanism 50 is limited according to the current valve timing of intake valves 81 in main control apparatus 70 and then output to first sub control apparatus 71. The value is also limited in first sub control apparatus 71 according to the current valve timing of intake valves 81 and then used for controlling compression ratio variable mechanism 50.

Referring to the functional block diagram of FIG. 3, a description is given below of limit processing for a target phase angle $VTC_{tg}$ in main control apparatus 70, that is, processing for changing an indicated range of the valve timing, and limit processing for a target phase angle $VTC_{tg}$ in second sub control apparatus 72, that is, processing for changing an indicated range of the valve timing.

Similar to the functional blocks of compression ratio variable mechanism 50 for calculating a target value, main control apparatus 70 includes a selection-high processing unit 70E, a target upper limit calculating unit 70F, a target value calculating unit 70G, and a selection-low processing unit 70H in order to calculate a target value used in variable valve timing mechanism 82.

Selection-high processing unit 70E receives a signal corresponding to an actual angle $VCR_{acs}$ of control shaft 25 in compression ratio variable mechanism 50, which is output form position sensor 50a, and a signal corresponding to an actual angle $VCR_{ac1}$ of control shaft 25 in compression ratio variable mechanism 50, which is obtained from first sub control apparatus 71.

Then, selection-high processing unit 70E selects one of the input signals, which corresponds to the higher top dead center of piston 33 compared to the other, and outputs the selected one as a limit-processing angle $VCR_{hi}$.

As the top dead center of piston 33 rises, the distance between the crown surface of piston 33 and the head of intake valves 81 reduces.

Accordingly, selection-high processing unit 70E selects one of the actual angle $VCR_{acs}$ and the actual angle $VCR_{ac1}$, which shortens the distance between piston 33 and intake valves 81 at the intake top dead center TDC and increases the possibility that the interference occurs compared to the other.

The signal corresponding to the angle $VCR_{hi}$, which is output from selection-high processing unit 70E is input to target upper limit calculating unit 70F.

Target upper limit calculating unit 70F calculates an angle-of-advance limit value $VTC_{limit}$ of the valve timing, which causes no interference between piston 33 and intake valves 81 at the angle $VCR_{hi}$, that is, the limit value of the phase angle in the direction of advancing the valve timing.

On the other hand, target value calculating unit 70G calculates the phase angle set with variable valve timing mechanism 82, that is, a target value $VTC_{tg}$ of the angle of advance of the valve timing, based on the operation state of internal combustion engine 10 as described above.

Selection-low processing unit 70H receives an angle-of-advance limit value $VTC_{limit}$, which is calculated with target upper limit calculating unit 70F and a target phase angle $VTC_{tg}$, which is calculated with target value calculating unit 70G, and selects one of them, which retards the valve timing of intake valves 81 compared to the other. Selection-low processing unit 70H outputs the selected one to second sub control apparatus 72 as a target phase angle $VTC_{tgm}$.

More specifically, selection-low processing unit 70H limits the target phase angle $VTC_{tgm}$ so that the valve timing of intake valves 81 does not advance beyond an angle-of-advance limit value $VTC_{limit}$, and then outputs a target phase angle $VTC_{tgm}$ subjected to limit processing toward second sub control apparatus 72.

In other words, main control apparatus 70 limits the indicated value for the angle of advance of the valve timing directed to second sub control apparatus 72 so that no interference occurs between piston 33 and intake valves 81 at the current compression ratio.

Meanwhile, second sub control apparatus 72 includes selection-high processing unit 72A, target upper limit calculating unit 72B, and selection-low processing unit 72C.

Selection-high processing unit 72A receives a signal corresponding to an actual angle $VCR_{acs}$ of control shaft 25 in compression ratio variable mechanism 50, which is output from position sensor 50a, a signal corresponding to the actual phase angle $VTC_{ac1}$ of control shaft 25 in compression ratio variable mechanism 50, which is obtained from first sub control apparatus 71, and a signal corresponding to a target angle $VTC_{tgm}$ subjected to limit processing in main control apparatus 70.

Selection-high processing unit 72A selects one of the actual angle $VCR_{acs}$, the actual angle $VCR_{ac1}$, and the target angle $VTC_{tgm}$, which corresponds to the highest piston position at the top dead center compared to the others. Then, selection-high processing unit 72A outputs the selected one as a limit-processing angle $VCR_{his}$.

In other words, selection-high processing unit 72A selects an angle among the actual angle $VCR_{acs}$, the actual angle $VCR_{ac1}$, and the target angle $VTC_{tgm}$, which shortens the distance between piston 33 and intake valves 81 at the intake top dead center and increases the possibility that the interference occurs compared to the others.

Target upper limit calculating unit 72B receives a signal corresponding to the limit-processing angle $VCR_{his}$, which is output from selection-high processing unit 72A.

Target upper limit calculating unit 72B calculates an angle-of-advance limit value $VTC_{limit2}$ for the valve timing, which causes no interference between piston 33 and intake valves 81 at the intake top dead center at the angle $VCR_{his}$.

Selection-low processing unit 72C receives a target phase angle $VTC_{tgm}$ output from selection-low processing unit 70H of main control apparatus 70 and the angle-of-advance limit value $VTC_{limit2}$ output from target upper limit calculating unit 72B.

Then, selection-low processing unit 72C selects one of the target phase angle $VTC_{tgm}$ and the angle-of-advance limit value $VTC_{limit2}$, which retards the valve timing of intake valves 81 compared to the other. Selection-low processing unit 72C outputs the selected one as a final target phase angle $VTC_{tg}$ used for controlling variable valve timing mechanism 82.

Here, second sub control apparatus 72 calculates a manipulated variable of an actuator of variable valve timing mechanism 82 based on the target phase angle $VTC_{tg}$ output from selection-low processing unit 72C and the actual phase angle $VTC_{acs}$ of variable valve timing mechanism 82 detected with phase angle sensor 82a.

Then, second sub control apparatus 72 outputs the calculated manipulated variable to the actuator of variable valve timing mechanism 82 to thereby execute control so that the valve timing of intake valves 81 changeable with variable valve timing mechanism 82 approximates the target value.

As described above, the target value of variable valve timing mechanism 82 is limited by main control apparatus 70 according to the current piston position at the top dead center and then output to second sub control apparatus 72. Further, the value is also limited by second sub control apparatus 72 according to the current piston position at the top dead center and then used for controlling variable valve timing mechanism 82.

The above configuration has the possibility that any failure occurs, for example, in a memory device such as a RAM or buffer which temporarily memorizes the target angle $VCR_{tg}$ and the target phase angle $VTC_{tg}$, for example, calculated by main control apparatus 70, and wrong values of the target angle $VCR_{tg}$ and the target phase angle $VTC_{tg}$ in the memory device are output to first sub control apparatus 71 and second sub control apparatus 72.

However, sub control apparatuses 71 and 72 execute processing to limit the target angle $VCR_{tg}$ and the target phase angle $VTC_{tg}$ to cause no interference between piston 33 and intake valves 81 at the intake top dead center and then use the values for control, making it possible to prevent the interference from occurring due to the failure of the memory device.

Further, selection-high processing units 70A and 70E execute processing for comparing the signals $VCR_{acs}$ and $VTC_{acs}$ of position sensor 50a and phase angle sensor 82a, which are directly input to main control apparatus 70, with the actual angle $VCR_{ac1}$ and the actual phase angle $VTC_{ac2}$, which are obtained from sub control apparatuses 71 and 72. Target upper limit calculating units 70B and 70F set upper limits based on the processing results.

Accordingly, even if a failure occurs in the memory device for temporarily memorizing the actual angle $VCR_{ac1}$ and the actual phase angle $VTC_{ac2}$, which are output from sub control apparatuses 71 and 72 to main control apparatus 70, it is possible to execute processing for limiting a target value so as to suppress the interference between piston 33 and intake valves 81.

Moreover, selection-high processing units 71A and 72A execute processing for comparing signals from position sensor 50a and phase angle sensor 82a, which are directly input to sub control apparatuses 71 and 72 with the actual angle $VCR_{ac1}$ and the actual phase angle $VTC_{ac2}$, which are input/output between sub control apparatuses 71 and 72. Target upper limit calculating units 71B and 72B set an upper limit based on the processing results.

Accordingly, even if a failure occurs in a memory device used for transmitting the actual angle $VCR_{ac1}$ and the actual phase angle $VTC_{ac2}$ between sub control apparatuses 71 and 72, it is possible to execute processing for limiting a target value so as to suppress the interference between piston 33 and intake valves 81.

In the processing of selection-high processing units 71A and 72A of sub control apparatuses 71 and 72, the target angle $VCR_{tg}$ and the target phase angle $VTC_{tg}$ as well as the actual angle $VCR_{ac}$ and the actual phase angle $VTC_{ac}$ are subjected to comparison.

Even if position sensor 50a and phase angle sensor 82a cause a failure, it is possible to execute processing for limiting a target value so as to suppress the interference between piston 33 and intake valves 81. Further, it is possible to prevent the interference from occurring due to a response delay in the limit processing when the actual top dead center of the piston and the actual valve timing get closer to a target value.

The interference between piston 33 and intake valves 81 can be suppressed even when a failure occurs in the memory device or sensor as mentioned above, making it almost unnecessary to set low piston position at the top dead center or set small angle of advance of the valve timing of intake valves 81 beforehand against a failure of a memory device, for example. This makes it possible to maximize variable ranges of the compression ratio and valve timing of intake valves 81 under normal operation of the memory device or sensor and hence improve the performance of internal combustion engine 10.

Regarding the memory device such as a RAM or a buffer, main control apparatus 70 or sub control apparatuses 71 and 72 execute diagnostics such as write diagnostics and read diagnostics. If any failure is found upon the diagnostics, sub control apparatuses 71 and 72 control compression ratio variable mechanism 50 and variable valve timing mechanism 82 in a predetermined fail safe mode.

During a period from the failure occurrence in the memory device such as a RAM or a buffer until the occurrence is found through the diagnostics, main control apparatus 70 and sub control apparatuses 71 and 72 execute processing for limiting a target value, i.e., fail safe processing to thereby suppress the interference between piston 33 and intake valves 81.

The configuration of FIG. 3 can be modified as follows. That is, position sensor 50a and phase angle sensor 82a are respectively duplicated, and high-selection processing units 71A, 72A, 70A, and 70E of sub control apparatuses 71 and 72 and main control apparatus 70 can receive signals from the duplicated sensors. Further executed is selection processing for selecting, among the output signals from the duplicated sensors, a detection signal that easily causes the interference compared to the others. The thus-selected sensor output signal is output to high-selection processing units 71A, 72A, 70A, and 70E In the configuration illustrated in the functional block diagram of FIG. 3, the target angle $VCR_{tgm}$ and the target phase angle $VTC_{tgm}$ calculated with main control apparatus 70 are output to both of selection-high processing units 71A and 72A and selection-low processing units 71C and 72C of sub control apparatuses 71 and 72. According to the configuration of FIG. 4, however, a control target value input to selection-low processing units 71C and 72C can be different from a control target value input to selection-high processing units 71A and 72A.

Figure 4:
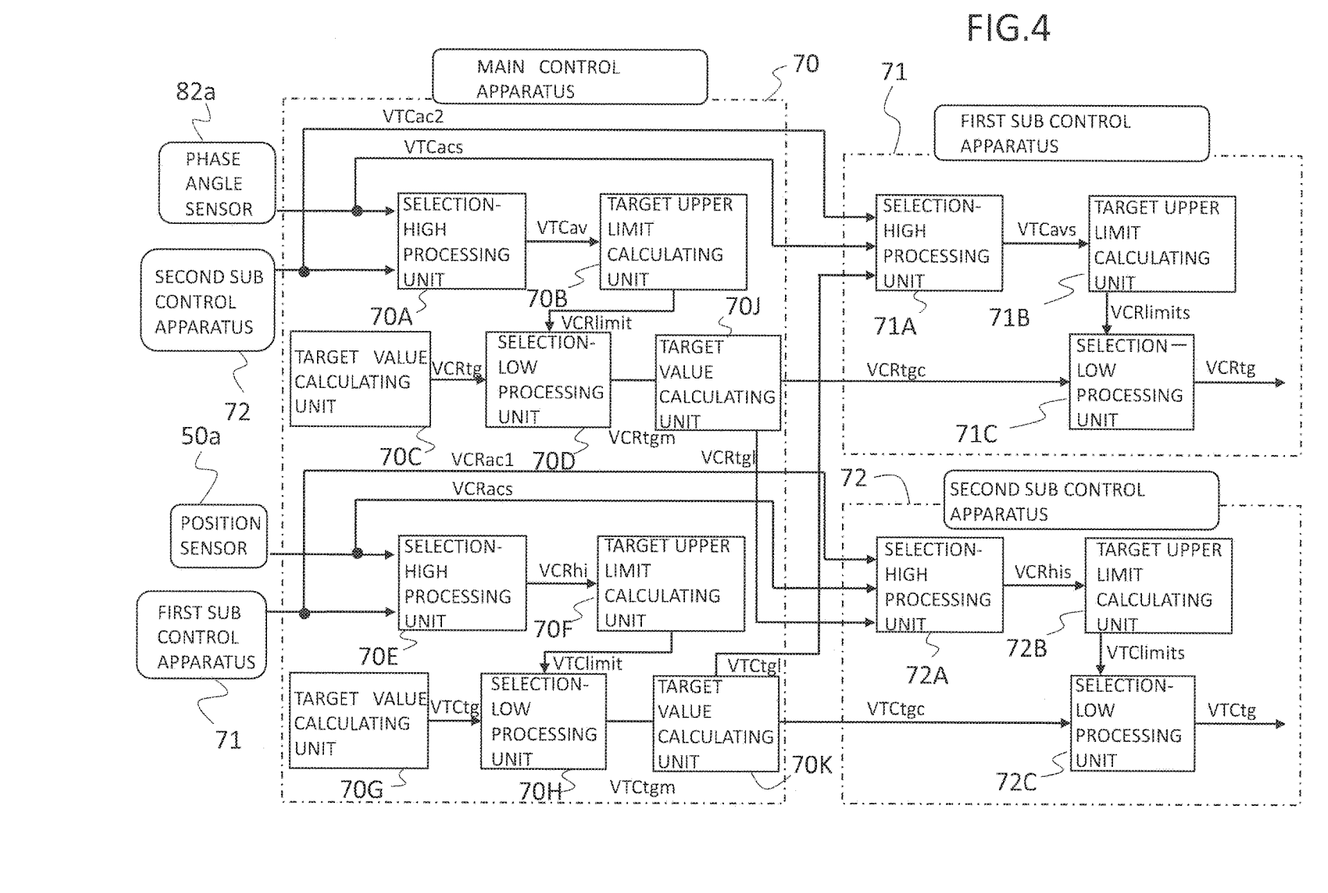
FIG. 4 is a functional block diagram illustrating processing of each control apparatus according to an embodiment of the present invention.

The functional block diagram of FIG. 4 differs from that of FIG. 3 in that main control apparatus 70 further includes target value calculating units 70J and 70K. The same blocks as in FIG. 3 are indicated by the same reference symbols and a detailed description thereof is omitted.

Target value calculating unit 70J receives a target angle $VCR_{tgm}$ output from selection-low processing unit 70D, and receives a signal corresponding to actual angle $VCR_{acs}$ of control shaft 25 of compression ratio variable mechanism 50, which is output from position sensor 50a and a signal corresponding to an actual angle $VCR_{ac1}$ of control shaft 25 of compression ratio variable mechanism 50, which is obtained from first sub control apparatus 71.

Then, target value calculating unit 70J sets a target value $VCR_{tgc}$ and a target value $VCR_{tgl}$ according to a target angle $VCR_{tgm}$ and a difference between an actual angle $VCR_{acs}$ and an actual angle $VCR_{ac1}$. Target value calculating unit 70J outputs a target value $VCR_{tgc}$ to selection-low processing unit 71C of first sub control apparatus 71 and also outputs a target value $VCR_{tgl}$ to selection-high processing unit 72A of second sub control apparatus 72.

Target value calculating unit 70J determines which of the actual angle $VCR_{acs}$ and the actual angle $VCR_{acs}$ is closer to a high compression ratio. If the actual angle $VCR_{acs}$ is closer to a high compression ratio, target value calculating unit 70J calculates a target value $VCR_{tgc}$ like this: $VCR_{tgc}=VCR_{tgm}-\Delta VCR_{ac}$ ($\Delta VCR_{ac}$=actual angle $VCR_{acs}$ actual angle $VCR_{ac1}$), and sets the target value $VCR_{tgl}$ equal to the target angle $VCR_{tgm}$.

Meanwhile, if the actual angle $VCR_{ac1}$ is closer to a high compression ratio, target value calculating unit 70J sets the target value $VCR_{tgc}$ like this: $VCR_{tgc}=VCR_{tgm}-\Delta VCR_{ac}$, and sets the target value $VCR_{tgl}$ like this: $VCR_{tgl}=VCR_{tgm}-\Delta VCR_{ac}$.

Similarly, target value calculating unit 70K receives a target phase angle $VTC_{tgm}$ output from selection-low processing unit 70H and in addition, receives a signal corresponding to an actual phase angle $VTC_{acs}$ of variable valve timing mechanism 82, which is output from phase angle sensor 82a and a signal corresponding to an actual phase angle $VTC_{ac2}$ of variable valve timing mechanism 82, which is obtained from second sub control apparatus 72.

Then, target value calculating unit 70K sets a target value $VTC_{tgc}$ and a target value $VTC_{tgc}$ according to a target phase angle $VTC_{tgm}$, and a difference between an actual phase angle $VTC_{acs}$ and an actual phase angle $VTC_{ac2}$. Target value calculating unit 70K outputs the target value $VTC_{tgc}$ to selection-low processing unit 72C of second sub control apparatus 72, and also outputs the target value $VTC_{tgc}$ to selection-high processing unit 71A of first sub control apparatus 71.

Target value calculating unit 70K determines which of the actual phase angle $VTC_{acs}$ and the actual phase angle $VTC_{ac2}$ advances the valve timing of intake valves 81 compared to the other. If the actual phase angle $VTC_{acs}$ advances the valve timing, target value calculating unit 70K calculates a control target value $VTC_{tgc}$ like this: $VTC_{tgc}=VTC_{tgm}-\Delta VTC_{ac}(\Delta VTC_{ac}=VTC_{acs}-VTC_{ac2})$ and sets the target value $VTC_{tgl}$ equal to the target phase angle $VTC_{tgm}$.

Meanwhile, if the actual phase angle $VTC_{ac2}$ advances the valve timing of intake valves 81 compared to the other, target value calculating unit 70K calculates a control target value $VTC_{tgc}$ like this: $VTR_{tgc}=VTC_{tgm}-\Delta VTC_{ac}$ and calculates a control target value $VTC_{tgl}$ like this: $VTC_{tgl}=VTC_{tgm}-\Delta VTC_{ac}$.

Main control apparatus 70 and first sub control apparatus 71 receive signals from position sensor 50a that detects an angle of control shaft 25 as the controlled variable of compression ratio variable mechanism 50. In some cases, the actual angle $VCR_{acs}$ read in main control apparatus 70 differs from the actual angle $VCR_{ac1}$ read in first sub control apparatus 71 due to variations during A/D conversion on sensor output signals.

First sub control apparatus 71 controls actuator 51 of compression ratio variable mechanism 50 to approximate an actual angle $VCR_{ac1}$ to a target angle $VCR_{tg}$ indicated by main control apparatus 70. Thus, if the actual angle $VCR_{acs}$ read in main control apparatus 70 differs from the actual angle $VCR_{ac1}$ read in first sub control apparatus 71, main control apparatus 70 might determine that compression ratio variable mechanism 50 is not controlled to set an actual angle corresponding to the target angle $VCR_{tg}$.

To overcome this, according to the configuration illustrated in the block diagram of FIG. 4, main control apparatus 70 corrects an indicated target angle $VCR_{tgm}$ for first sub control apparatus 71 in accordance with a difference between the actual angle $VCR_{acs}$ read in main control apparatus 70 and the actual angle $VCR_{ac1}$ read in first sub control apparatus 71.

As a result, main control apparatus 70 can correctly determine if compression ratio variable mechanism 50 is controlled to set an actual angle corresponding to a target angle $VCR_{tg}$.

On the other hand, consider the case of executing the processing for limiting a target value to suppress the interference based on a target angle $VCR_{tgm}$ corrected by a difference between an actual angle $VCR_{acs}$ and an actual angle $VCR_{ac1}$. In this case, if $VCR_{acs}>VCR_{ac1}$, the target angle $VCR_{tgm}$ is corrected to reduce a compression ratio, in other words, to increase the possibility that the interference occurs.

In view of this, according to the configuration illustrated in the block diagram of FIG. 4, main control apparatus 70 executes processing for correcting a wrong target value resulting from a difference between the actual angle $VCR_{acs}$ and the actual angle $VCR_{ac1}$ in such a way that the target value $VCR_{tgl}$ obtained under the condition of $VCR_{acs}>VCR_{ac1}$ is set equal to the target angle $VCR_{tgm}$. Owing to this processing, the interference can be suppressed.

Similar to the above, regarding signal transmission between main control apparatus 70 and second sub control apparatus 72, an indicated target phase angle $VTC_{tgm}$ for second sub control apparatus 72 is corrected by a difference between an actual phase angle $VTC_{acs}$ read in main control apparatus 70 and an actual phase angle $VTC_{ac2}$ read in second sub control apparatus 72. Accordingly, main control apparatus 70 can correctly determine if variable valve timing mechanism 82 is controlled to set an actual phase angle corresponding to the target phase angle $VTC_{tg}$.

Further, if $VTC_{acs} > VTR_{ac2}$, a target value $VTC_{tg1}$ is set equal to a target phase angle $VTC_{tgm}$, thereby reducing a possibility that the interference occurs due to the correction on a target value by a difference between an actual phase angle $VTC_{acs}$ and an actual phase angle $VTC_{ac2}$.

As main control apparatus 70 is provided with target value calculating units 70J and 70K illustrated in FIG. 4, main control apparatus 70 can precisely determine if a controlled variable corresponds to an indicated target value for sub control apparatuses 71 and 72 while the interference between piston 33 and intake valves 81 can be suppressed.

If a difference between an actual angle $VCR_{acs}$ and an actual angle $VCR_{ac1}$ exceeds a threshold value, at least one of main control apparatus 70 and first sub control apparatus 71 can execute fail-safe processing to keep compression ratio variable mechanism 50 safe. Further, if a difference between an actual phase angle $VTC_{acs}$ and an actual phase angle $VTC_{ac2}$ exceeds a threshold value, at least one of main control apparatus 70 and second sub control apparatus 72 can execute fail-safe processing to keep variable valve timing mechanism 82 safe.

The fail-safe processing executed by main control apparatus 70 is, for example, processing for fixing a target value directed to sub control apparatuses 71 and 72 to a fail-safe target value.

In addition, the fail-safe processing executed by sub control apparatuses 71 and 72 is, for example, processing for fixing a manipulated variable directed to actuators of compression ratio variable mechanism 50 and variable valve timing mechanism 82 to a fail-safe manipulated variable. Note that the fail-safe manipulated variable includes such a manipulated variable as stops actuator operations.

Moreover, at least one of main control apparatus 70 and sub control apparatuses 71 and 72 can execute processing for interrupting power supply to the actuator of variable valve timing mechanism 82 as fail-safe processing.

Figure 5:
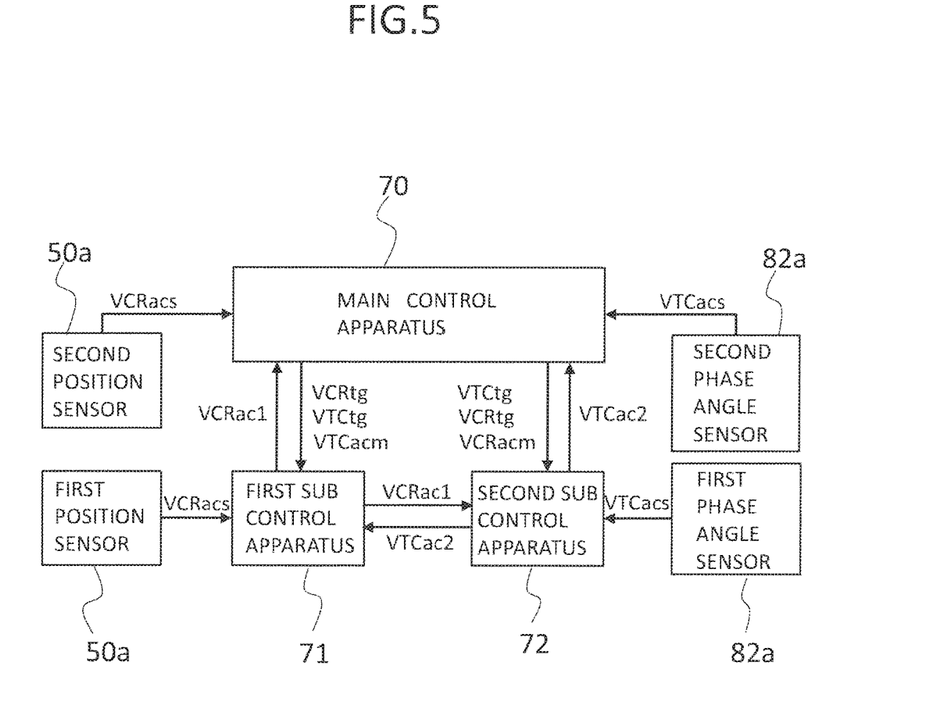
FIG. 5 is a block diagram illustrating the configuration of a control system for an internal combustion engine according to an embodiment of the present invention.

As illustrated in FIG. 5, it is possible to duplicate position sensor 50a for detecting actual angle $VCR_{acs}$ of control shaft 25 in compression ratio variable mechanism 50 to input an output from one position sensor 50a (1) to first sub control apparatus 71 while inputting an output from the other position sensor 50a (2) to main control apparatus 70.

It is also possible to duplicate phase angle sensor 82a for detecting an actual phase angle $VTC_{acs}$ in variable valve timing mechanism 82 to input an output from one phase angle sensor 82a (1) to second sub control apparatus 72 while inputting an output from the other phase angle sensor 82a (2) to main control apparatus 70.

Here, duplicated sensors can have different resolutions. For example, a sensor connected to sub control apparatuses 71 and 72 may have higher resolution than the one connected to main control apparatus 70. As illustrated in FIG. 4, main control apparatus 70 can be provided with target value calculating units 70J and 70K.

Any failure in the thus-configured duplicated sensors can be detected based on a difference in detection value between the sensors. As described above, however, if the sensors show different detection values due to variations upon A/D conversion between main control apparatus 70 and sub control apparatuses 71 and 72 and in addition, the sensors of different resolutions are used in combination, the different resolutions lead to a difference in detection value.

In view of this, a failure-decision threshold value used for comparison with a difference in detection value between sensors is set according to the sum of the variations upon A/D conversion and the difference in resolution, making it possible to determine that a sensor failure occurs if the difference in detection value exceeds the failure-decision threshold value.

In addition, different fail-safe processings can be carried out depending on which one of the duplicated sensors causes a failure.

For example, it is possible to learn an sensor output under the condition that a target amount is controlled to a mechanically-defined stopper position that defines a variable range of the controlled variable of compression ratio variable mechanism 50 and variable valve timing mechanism 82 to thereby specify a failed sensor based on a change in learning value over time.

Among position sensor 50a (2) and phase angle sensor 82a (2) connected to main control apparatus 70 and position sensor 50a (1) and phase angle sensor 82a (1) connected to sub control apparatuses 71 and 72, if detected that the sensor connected to main control apparatus 70 causes a failure, sub control apparatuses 71 and 72 can keep controlling compression ratio variable mechanism 50 and variable valve timing mechanism 82 based on outputs from position sensor 50a (1) and phase angle sensor 82a (1).

On the other hand, if the sensor connected to sub control apparatuses 71 and 72 causes a failure, sub control apparatuses 71 and 72 can keep controlling compression ratio variable mechanism 50 and variable valve timing mechanism 82 based on a detection value output from main control apparatus 70.

In this case, there is a possibility that some time is required for communication between main control apparatus 70 and sub control apparatuses 71 and 72, which leads to delayed updating of the detection value and overshoot in controlled variable. In this way, controllability might lower.

To eliminate the possibility, if any sensor connected to sub control apparatuses 71 and 72, a compression ratio changeable with compression ratio variable mechanism 50 and the valve timing changeable with variable valve timing mechanism 82 could be controlled to a fixed fail-safe target value or a gain could be reduced so as to minimize overshoot resulting from delayed updating of a detection value to thereby continue feedback control.

Hereinabove, the present invention has been described in detail with reference to the preferred embodiments but it is apparent that those skilled in the art could employ various modifications based on the basic technical ideas and teaching of the present invention.

In the above embodiment, the control is executed to suppress the interference between piston 33 and intake valves 81 in internal combustion engine 10 provided with compression ratio variable mechanism 50 and variable valve timing mechanism 82. As is obvious, however, if provided with a variable valve timing mechanism that can change the valve timing of exhaust valves 91, the processing is executed in the same manner as the embodiment, making it possible to suppress the interference between piston 33 and exhaust valves 91.

Note that if the valve timing of exhaust valves 91 is variable, the direction of retarding the valve timing corresponds to the direction in which the distance between exhaust valves 91 and piston 33 at the top dead center is shortened and the possibility that the interference occurs is increased.

In the above embodiment, compression ratio variable mechanism 50 and variable valve timing mechanism 82 are both subjected to the processing for limiting a target value in main control apparatus 70 and the processing for limiting a target value in sub control apparatuses 71 and 72. However, either compression ratio variable mechanism 50 or variable valve timing mechanism 82 can be subjected to the processing for limiting a target value in main control apparatus 70 and the processing for limiting a target value in sub control apparatuses 71 and 72.

In addition, the variable valve mechanism is not limited to variable valve timing mechanism 82. It is possible to adopt a variable operation angle mechanism that can change an open timing of intake valves 81 or exhaust valves 91 (in other words, operation angle of exhaust valves 91) or both the variable operation angle mechanism and variable valve timing mechanism 82. In addition, the variable valve mechanism can be an electromagnetic valve drive mechanism for opening/closing intake valves 81 with an actuator such as an electromagnet. It is obvious that the above processing is executed on these variable valve mechanisms to thereby achieve similar advantageous effects.

A combination of the first and second controlled objects is not limited to a combination of compression ratio variable mechanism 50 and the variable valve mechanism. For example, consider the case of combining the variable valve timing mechanism and the variable operation angle mechanism, both of which are variable valve mechanisms. In this case, when the variable valve timing mechanism and the variable operation angle mechanism are operated at the same time, the above processing can be applied to prevent an open/close timing of an engine valve from excessively differing from the target timing during processing.

Further, it is possible to employ such configuration that main control apparatus 70, first sub control apparatus 71, and second sub control apparatus 72 are connected through a controller area network, and main control apparatus 70, first sub control apparatus 71, and second sub control apparatus 72 transmit/receive a detection value or target value of a controlled variable by means of a CAN buffer.

The present invention is not limited to the configuration where main control apparatus 70, first sub control apparatus 71 and second sub control apparatus 72 are separately provided. A single unit having the functions of main control apparatus 70, first sub control apparatus 71, and second sub control apparatus 72 can be provided instead.

REFERENCE SYMBOL LIST

10 Engine
33 Piston
50 Compression ratio variable mechanism (first controlled object)
70 Main control apparatus
71 First sub control apparatus
72 Second sub control apparatus
81 Intake valve
82 Variable valve timing mechanism (variable valve mechanism, second controlled object)

The invention claimed is:

1. A control apparatus for an internal combustion engine equipped with:
a compression ratio variable mechanism configured to change a top dead center of a piston of the internal combustion engine to thereby change a mechanical compression ratio of the internal combustion engine; and
a variable valve mechanism configured to change a valve timing of an intake valve of the internal combustion engine,
the control apparatus comprising:
a first sub control apparatus including a first microcomputer configured to control the compression ratio variable mechanism;
a second sub control apparatus including a second microcomputer configured to control the variable valve mechanism; and
a main control apparatus including a third microcomputer configured to calculate a target mechanical compression ratio and output the calculated ratio to the first sub control apparatus, as well as calculate a target valve timing and output the calculated timing to the second sub control apparatus,
wherein the main control apparatus is configured to
calculate a first upper limit of a mechanical compression ratio based on the valve timing of the intake valve;
calculate a first target mechanical compression ratio based on an operation state of the internal combustion engine; and
compare the first upper limit and the first target mechanical compression ratio, and output a lower one of the first upper limit and the first target mechanical compression ratio as a second target mechanical compression ratio to the first sub control apparatus,
wherein the first sub control apparatus is configured to
calculate a second upper limit of the mechanical compression ratio based on the valve timing of the intake valve;
compare the second upper limit and the second target mechanical compression ratio, and output a lower one of the second upper limit and the second target mechanical compression ratio as a third target mechanical compression ratio, and
control the compression ratio variable mechanism based on the third target mechanical compression ratio.

2. The control apparatus for an internal combustion engine according to claim 1, wherein:
the main control apparatus is further configured to
calculate a first limit value of the valve timing of the intake valve based on the mechanical compression ratio of the internal combustion engine;
calculate a first target valve timing based on the operation state of the internal combustion engine; and
compare the first limit value and the first target valve timing, and output a later one of the first limit value and the first target valve timing as a second target valve timing to the second sub control apparatus,
the second sub control apparatus is configured to
calculate a second limit value of the valve timing of the intake valve based on the mechanical compression ratio of the internal combustion engine;
compare the second limit value and the second target valve timing, and output a later one of the second limit value and the second target valve timing as a third target valve timing, and
control the variable valve mechanism based on the third target valve timing.

3. The control apparatus for an internal combustion engine according to claim 2, wherein:
- the compression ratio variable mechanism comprises a first sensor configured to detect the mechanical compression ratio of the internal combustion engine;
- the main control apparatus and the first sub control apparatus are configured to receive a detection signal from the first sensor;
- the main control apparatus is further configured to compare a detection value of the mechanical compression ratio, which is calculated from the detection signal of the first sensor, and a detection value of the mechanical compression ratio received from the first sub control apparatus to thereby select a higher one of the detection value calculated from the detection signal of the first sensor and the detection value received from the first sub control apparatus, and
- calculate the first limit value based on the selected mechanical compression ratio.

4. The control apparatus for an internal combustion engine according to claim 3, wherein:
- the variable valve mechanism comprises a second sensor configured to detect a valve timing of the intake valve,
- the main control apparatus and the second sub control apparatus are configured to receive a detection signal from the second sensor,
- the main control apparatus is further configured to
  - compare a detection value of the valve timing, which is calculated from the detection signal of the second sensor, and a detection value of the valve timing received from the second sub control apparatus to thereby select an earlier one of the detection value calculated from the detection signal of the second sensor and the detection value received from the second sub control apparatus, and
  - calculate the first upper limit based on the selected valve timing.

5. The control apparatus for an internal combustion engine according to claim 4, wherein:
- the first sub control apparatus is further configured to compare the detection value of the valve timing, which is calculated from the detection signal of the second sensor, the detection value of the valve timing received from the second sub control apparatus, and the second target valve timing to thereby select the earliest one of them, and
- calculate the second upper limit based on the selected valve timing.

6. The control apparatus for an internal combustion engine according to claim 5, wherein:
- the second sub control apparatus is further configured to
  - compare the detection value of the mechanical compression ratio, which is calculated from the detection signal of the first sensor, the detection value of the mechanical compression ratio received from the first sub control apparatus, and the second target mechanical compression ratio to thereby select the highest one of them, and
  - calculate the second limit value based on the selected mechanical compression ratio.

* * * * *